United States Patent
Kriett et al.

(10) Patent No.: US 11,948,109 B1
(45) Date of Patent: Apr. 2, 2024

(54) RESOURCE PLANNING USING BLOCK AND ROUTE INFORMATION

(71) Applicant: Amazon Technologies, Inc., Seattle, WA (US)

(72) Inventors: Phillip Oliver Kriett, Lynnwood, WA (US); Philip Mark Kaminsky, El Cerrito, CA (US); Ivan Borges Oliveira, Bellevue, WA (US); Manik Kumar, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 17/331,272

(22) Filed: May 26, 2021

(51) Int. Cl.
| | |
|---|---|
| *G06Q 10/0631* | (2023.01) |
| *G06F 16/242* | (2019.01) |
| *G06Q 10/047* | (2023.01) |
| *G06Q 10/0834* | (2023.01) |
| *G06Q 10/0835* | (2023.01) |

(52) U.S. Cl.
CPC ... *G06Q 10/06313* (2013.01); *G06F 16/2425* (2019.01); *G06Q 10/047* (2013.01); *G06Q 10/06312* (2013.01); *G06Q 10/08345* (2013.01); *G06Q 10/08355* (2013.01)

(58) Field of Classification Search
CPC ....... G06Q 10/06313; G06Q 10/06312; G06Q 10/047; G06Q 10/08345; G06Q 10/08355; G06Q 30/08; G06Q 10/0838; G06Q 10/0875; G06F 16/2425
See application file for complete search history.

(56) References Cited

U.S. PATENT DOCUMENTS

| | | | |
|---|---|---|---|
| 8,571,915 B1 * | 10/2013 | Wong | G06Q 10/06 705/7.26 |
| 2003/0167109 A1 * | 9/2003 | Clarke | G06Q 10/06312 701/3 |

(Continued)

OTHER PUBLICATIONS

Euchi, "The Vehicle Routing Problem With Private Fleet and Multiple Common Carriers: Solution With Hybrid Metaheuristic Algorithm," Vehicular Communications, vol. 9, 2017, pp. 97-108.

(Continued)

*Primary Examiner* — Rutao Wu
*Assistant Examiner* — Stephen S Swartz
(74) *Attorney, Agent, or Firm* — Kilpatrick Townsend & Stockton LLP (57) ABSTRACT

Techniques for planning resources using block and route information are described. In an example, a computing system determines a demand for item transportation expected during a planning horizon. The computing system determines information about a pre-planned transportation resource available during the planning horizon and costs associated with the pre-planned transportation resource. The computing system uses an optimization model to determine a block having a time length, a tour to transport, during the block, a first portion of the demand using the pre-planned transportation resource, and a second portion of the demand to be transported using an on-demand transportation resource. The computing system indicates, to a first computing device of the pre-planned transportation resource, an assignment of the block to the pre-planned transportation resource.

20 Claims, 8 Drawing Sheets

(56) References Cited

U.S. PATENT DOCUMENTS

2015/0317653 A1* 11/2015 Ettl ................... G06Q 30/0202
                                                        705/7.31
2017/0046658 A1*  2/2017 Jones ...................... H04W 4/02
2017/0352003 A1* 12/2017 Bertoli .................. G06Q 10/04
2018/0211201 A1*  7/2018 Nayak .............. G06Q 10/06314
2018/0349849 A1* 12/2018 Jones .............. G06Q 10/08345

OTHER PUBLICATIONS

Kriett et al., U.S. Appl. No. 17/845,439, filed Jun. 21, 2022, Titled: Techniques for Reactive Route Planning, 45 pages.

* cited by examiner

RESOURCE PLANNING USING BLOCK AND ROUTE INFORMATION

BACKGROUND

More and more users and entities are turning to online services for day-to-day activities. Many of the services span both the digital world and the physical world. For example, a user may operate a computing device to order an item from a web site. The item may be delivered from a storage facility to a delivery location of the user. Generally, the delivery of the item may involve a contracted, pre-planned delivery driver, or an on-demand delivery driver.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, optimizing a resource plan associated with a transportation of items. The resource plan is deployed to control the use of delivery resources, such as by managing the schedule, capacity, and tours of such resources. To generate the resource plan, a demand for expected item transportation can be determined for an upcoming time period (e.g., a planning horizon). Additionally, availability and cost information for pre-planned transportation resources (e.g., delivery drivers) can be determined. The costs associated with pre-planned transportation resources can be independent of usage of the pre-planned transportation resource. Cost information for on-demand transportation resources can also be determined. Such costs can depend on actual usage. An optimization model can then use the demand, the availability information, the costs associated with the pre-planned transportation resource, and the costs associated with using on-demand transportation resources to determine the resource plan by optimizing an overall item transportation cost. The resource plan may include the number of blocks (e.g., capacity) and timing of the blocks (e.g., schedule), where the blocks correspond to shifts for the pre-planned transportation resource. These blocks can be generated for a particular region. Further, the resource plan may include tours (e.g., routes) for transporting items during the blocks. The tours may change as the actual demand for the planning horizon is determined. For example, an actual demand for a day can be determined the day before and the tours for that day are updated the day before given the actual demand. In this example, the blocks scheduled for that day are not changed, but the tours assigned to these blocks are updated. The resource plan can also include an indication of a portion of the demand that is to be transported using the on-demand transportation resource. The on-demand transportation resource may also receive a portion of the blocks and/or tours for transporting the portion of the demand. An assignment of the block and the tour to the pre-planned transportation resource can be indicated to a computing device associated with the pre-planned transportation resource, and an availability of the portion of the demand can be indicated to a computing device associated with the on-demand transportation resource. Based on the distribution of the resource plan to the computing devices, the various transportation resources can be deployed in an efficient manner to transport items during the planning horizon.

To illustrate, consider an example of items that are to be transported from a fulfillment center to customer addresses. A forecasted demand is determined for a planning horizon (e.g., an upcoming week), along with costs associated with contracted, pre-planned delivery drivers that are available during the planning horizon, and costs associated with non-contracted, on-demand delivery drivers. An optimization model can receive these factors as inputs. Optimizing cost, the optimization model can determine blocks and tours associated with each block. The optimization model also determines a portion of the demand to be transported by the on-demand delivery drivers. In a particular illustrative example, given the computational complexity to find an optimal solution because of the large number of variables, the optimization model can adopt a restricted master problem (RMP) approach in an iterative search for the optimal solution and can jointly consider resource information (e.g., block schedules, block capacities) and tour information (e.g., a planned route). The block schedule is then presented on a device of the pre-planned delivery driver (or a group of pre-planned delivery drivers), and the available blocks or loads of the demand are presented (e.g., in a dashboard) on a device of the on-demand delivery drivers to be selected and serviced by the on-demand delivery drivers.

Embodiments of the present disclosure provide various technological advantages over a conventional computer system that generates a resource plan for transporting items. For example, the system may generate the resource plan for a next planning horizon (e.g., a week). The amount of input parameters and constraints may be large (e.g., millions of input data points and millions of constraint data points). Absent the embodied techniques, finding the optimal solution timely support an execution of a plan that uses the solution may be computationally infeasible. The embodied techniques involve an iterative approach that guarantees a convergence of the capacity plan towards the optimum (e.g., the plan with the lowest total cost of internal capacity and external capacity which is needed to meet the expected demand). Furthermore, although various embodiments are described herein in connection with optimizing an overall cost, the optimization can be for one or more other parameters. Optimization parameters can include transportation throughput, transportation time, or any other parameter that may impact the use of a transportation resource. When a resource plan is optimized for an optimization parameter, the optimization improves how pre-planned and/or on-demand transportation resources are used.

Figure 1:
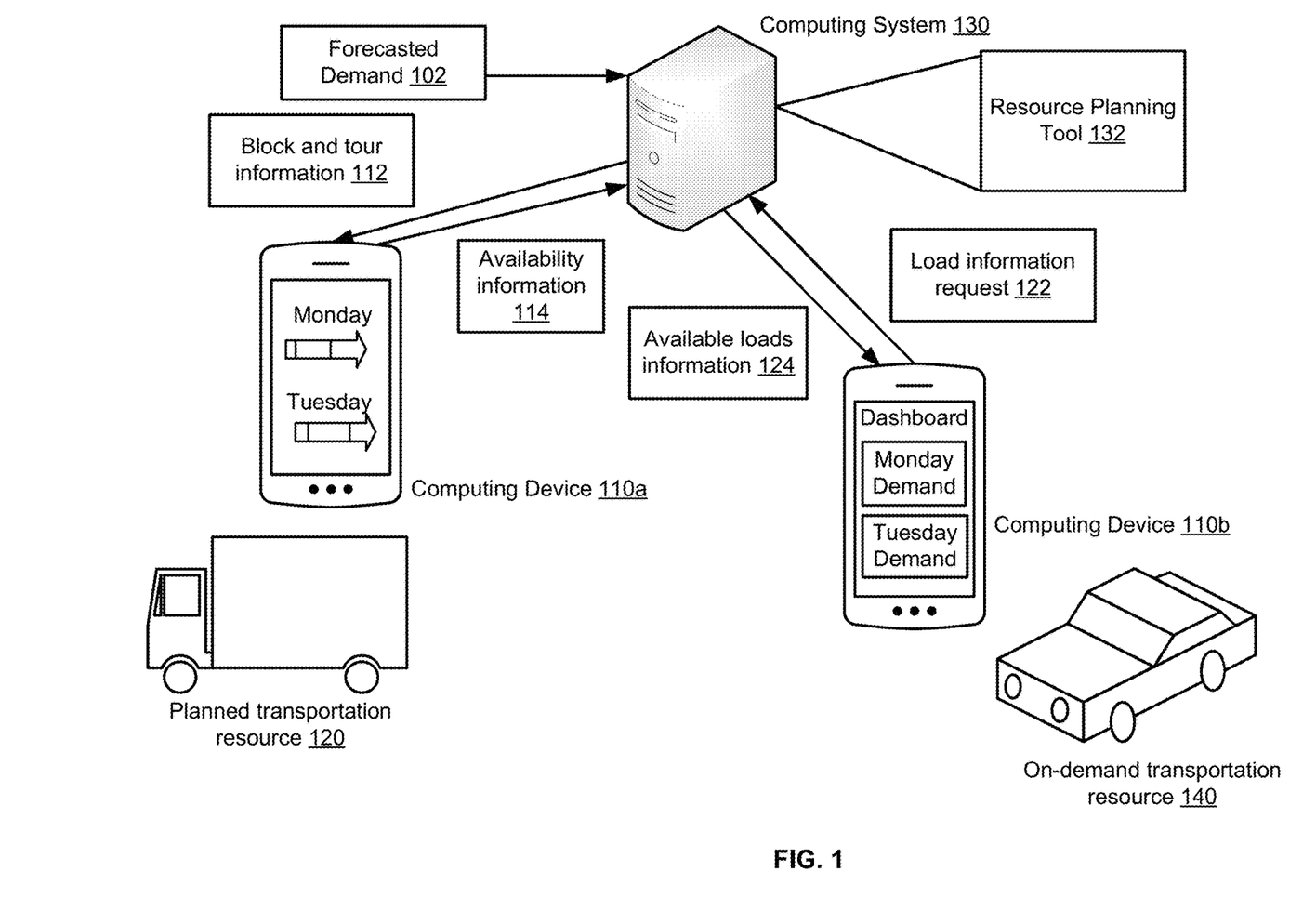
FIG. 1 illustrates an example environment for generating a resource plan for item transportation, according to an embodiment of the present disclosure.

FIG. 1 illustrates an example environment for generating a resource plan for item transportation, according to an embodiment of the present disclosure. A computing system 130 determines the resource plan based on a forecasted demand 102 and availability information 114 for a planned transportation resource 120 (e.g., one or more contracted delivery drivers associated with a pre-planned delivery service). The computing system 130 can be a server, a cloud computing service, or a back end system, configured to generate a resource plan. The forecasted demand 102 is a demand for item transportation expected during a planning horizon (e.g., the upcoming week). The forecasted demand 102 may be determined based on previous demands for previous planning horizons.

The availability information 114 can include times for which the planned transportation resource 120 is available during the planning horizon. For example, the availability information 114 can indicate the planned transportation resource 120 is available 8:00 am to 5:00 pm Monday through Friday of the planning horizon. Additionally, the availability information 114 may be based on a delivery driver type. Examples of delivery driver types include single-day drivers, two-day drivers, and extended-trip drivers, etc. The availability information 114 can also include a pre-defined cost associated with the planned transportation resource 120. The pre-defined cost can be independent of usage of the pre-planned transportation resource during the planning horizon. In other words, the planned transportation resource 120 is paid whether the planned transportation resource 120 is used to transport a portion of the forecasted demand 102 or not (e.g., the pre-defined cost is a sunk cost). The availability information 114 can be received by the computing system 130 from a computing device 110a associated with the planned transportation resource 120 (or the pre-planned delivery service).

The computing system 130 also receives a load information request from a computing device 110b associated with an on-demand transportation resource 140. The on-demand transportation resource 140 may be part of a loadboard or spot market where a delivery driver can select and book loads of items to deliver in a certain timeframe. The on-demand transportation resource 140 can be associated with a cost that depends on usage of the on-demand transportation resource 140. In other words, the cost is only incurred if the on-demand transportation resource 140 is used to deliver a portion of the forecasted demand 102.

The computing system includes a resource planning tool 132 to determine blocks (e.g., time lengths (shifts) of item deliveries by the planned transportation resource 120), tours assignable to the planned transportation resource to transport a portion of the forecasted demand 102, and a remaining portion of the forecasted demand 102 to be transported using the on-demand transportation resource 140. A block can be specific to a region (e.g., the city of Seattle). A tour assigned to the block can be a route with an origin and destination location that are the same and are in the region and with delivery and handling locations along the way. The tours may change over time as the actual demand for the planning horizon is determined.

The resource planning tool 132 can include an optimization model that determines the resource plan including the blocks, tours, and remaining demand. The optimization model can jointly evaluate tours and blocks to determine the resource plan that minimizes cost. The optimization model explores variables to find an optimal solution. The variables include the block capacity, block schedule, and tours. The optimal solution can be defined using one or more optimization parameters, such as the overall cost. Given the large volume of loads and large delivery resource base (e.g., number of driers and driver types), the search for the optimal solution can be computationally challenging, if not impossible. In an example, to overcome the computational challenge, the optimization model involves an RMP approach that can simplify the search. The minimized cost can balance sunk costs of the planned transportation resource 120 with use costs of the on-demand transportation resource.

Once the computing system 130 determines the blocks and tours for the planned transportation resource 120 and the remaining demand for the on-demand transportation resource 140, the computing system 130 can transmit the block and tour information 112 to be displayed at the computing device 110a. The block and tour information 112 may be displayed as a schedule for the planned transportation resource 120. The computing device 110a can display a start time of the block, an indication of the tour to cover during the block, and an indication of a region of the tour.

The computing system 130 can also transmit available loads information 124 of the remaining demand to be displayed at the computing device 110b. In response to receiving a load information request 122, the computing device 110b can display the available loads information 124 at the computing device 110b. The available loads information 124 may be displayed as a dashboard showing the loads of demand and a timing of the delivery of the loads that can be selected for delivery by the on-demand transportation resource 140. Instead of sending the available loads information 124, the computing system 130 can send information about blocks that have not been assigned to the planned transportation resources (e.g., unassigned blocks). In this case, tours that have been assigned to the unassigned blocks may or may not also be identified to the computing device 110b. In this way, an operator of the computing device 110b can select and reserve loads and/or unassigned blocks.

The planned transportation resource 120 and the on-demand transportation resource 140 are deployed according to the resource plan. The block and tour information 112 can control the planned transportation resource 120, and the available loads information 124 and the load information request 122 can control the on-demand transportation resource 140. By generating an optimized resource plan, the usage of the planned transportation resource 120 and the on-demand transportation resource 140 is likewise optimized.

Additionally or alternatively, the optimization may be for a transportation throughput (e.g., maximizing the number of loads that are transported during the planning horizon. In such examples, the overall throughput of the transportation network is improved by deploying the planned transportation resource 120 and the on-demand transportation resource 140 according to the resource plan.

Although the example in FIG. 1 illustrates one planned transportation resource and one on-demand transportation resource, other examples can include multiple of each. Thus, the forecasted demand 102 can be distributed among the planned transportation resources and on-demand transportation resources to minimize the transportation cost of the forecasted demand 102.

Figure 2:
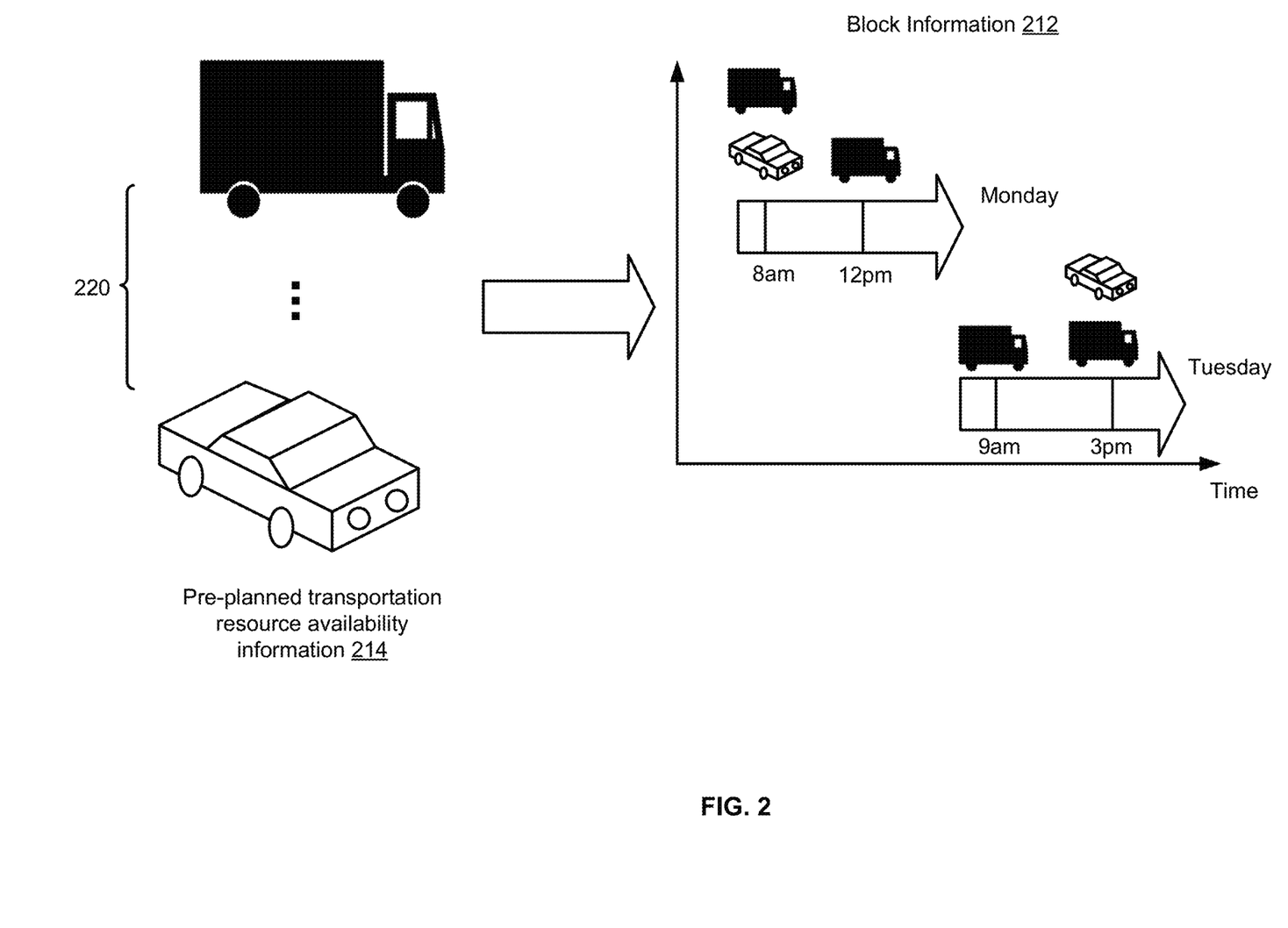
FIG. 2 illustrates an example of blocks scheduled based on availability information of a pre-planned transportation resources, according to an embodiment of the present disclosure.

FIG. 2 illustrates an example of blocks scheduled based on availability information of a pre-planned transportation resources, according to an embodiment of the present disclosure. The blocks may be determined by a computing system, such as the computing system 130 in FIG. 1.

In an example, the computing system determines pre-planned transportation resource availability information 214. The availability information 214 can be for multiple pre-planned transportation resources 220. The pre-planned transportation resources 220 can include one or more types of delivery vehicles, such as a truck, car, plane, or other vehicle. Each of the pre-planned transportation resources 220 and associated driver type is associated with a cost that is independent of whether the pre-planned transportation resource is used. Thus, the costs associated with the pre-planned transportation resources 220 can be considered to be sunk costs.

The computing system determines block information 212 based on the availability information 214 and a forecasted demand for the planning horizon associated with the availability information 214. Each block is allocated to a single transportation resource, which may be operated by a single driver or a group of drivers. The block information 212 can include a block schedule and a block capacity (e.g., a number of blocks within the planning horizon). As an example, the block information 212 can indicate a block capacity of six blocks for Monday and Tuesday. The block information 212 can also include a schedule that indicates two of the pre-planned transportation resources 220 are to begin a delivery tour at 8:00 am on Monday and one of the pre-planned transportation resources 220 is to begin a delivery tour at 12:00 pm on Monday. The block information 212 can also indicate one of the pre-planned transportation resources 220 is to begin a delivery tour at 9:00 am and two of the pre-planned transportation resources 220 are to begin a delivery tour at 3:00 pm. The pre-planned transportation resources 220 scheduled on Tuesday may be the same or different pre-planned transportation resources as those scheduled on Monday. The block information 212 can also include an end time for each of the pre-planned transportation resources 220 each day. The computing system can determine the block information 212 so as to optimize the item transportation cost by balancing between sunk costs of the pre-planned transportation resources 220 and costs associated with using on-demand transportation resources for transporting a portion of the forecasted demand.

Figure 3:
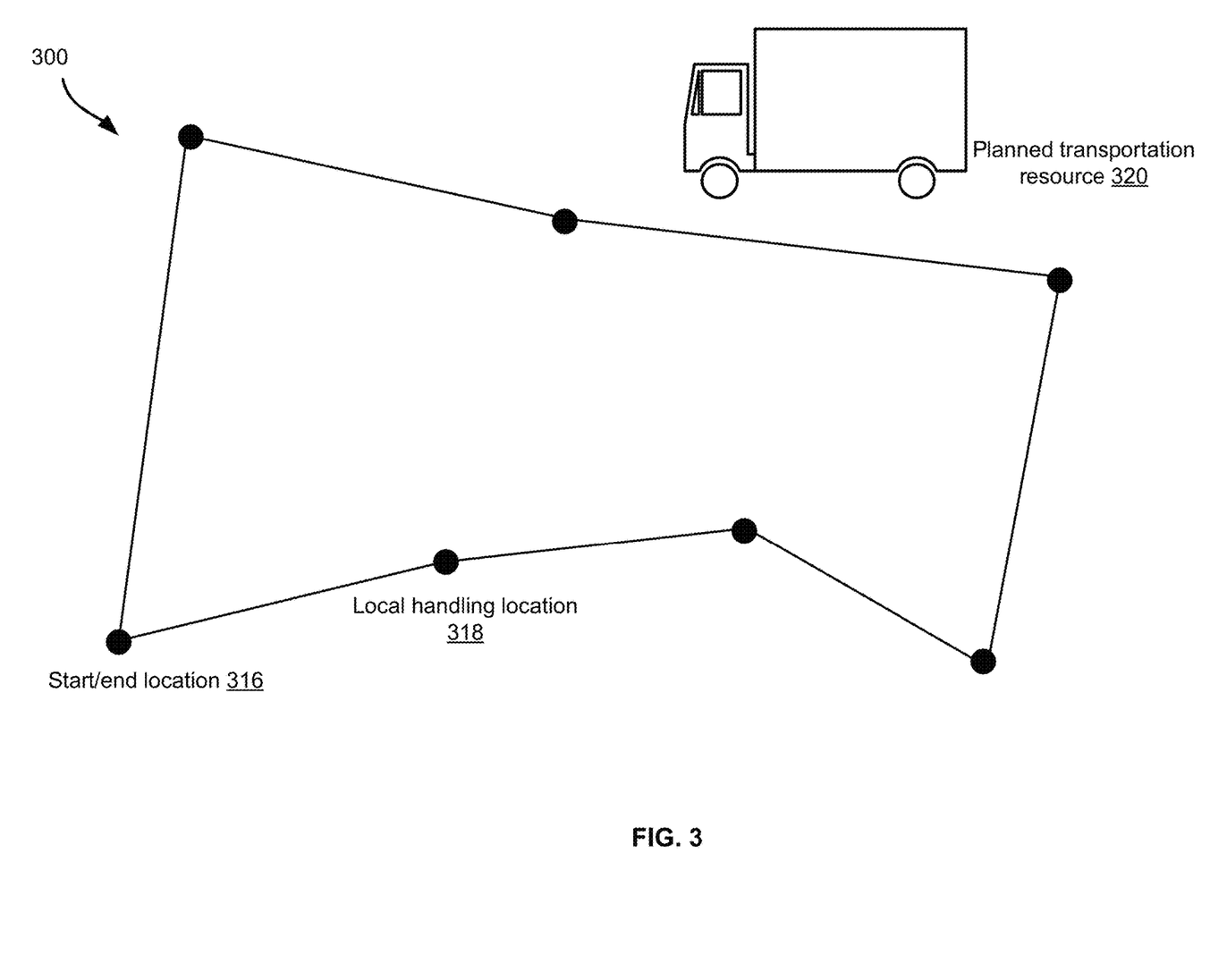
FIG. 3 illustrates an example of a tour for transporting a portion of an item demand, according to an embodiment of the present disclosure.

FIG. 3 illustrates an example of a tour 300 for transporting a portion of an item demand, according to an embodiment of the present disclosure. The tour can be determined by a computing system, such as the computing system 103 in FIG. 1.

In an example, the computing system can know the blocks and a number of pre-planned transportation resources, so a tour 300 for each pre-planned transportation resource (e.g., a driver or group of drivers) during each block can be determined. For a pre-planned transportation resource 320, the tour 300 can include a start and end location 316, which may be a fulfilment center. The tour 300 can serve one or more loads of items. For instance, each point in the tour 300 may correspond to a local handling location 318 or a delivery location. At the local handling location 318, a load may be picked up or dropped off by the pre-planned transportation resource 320.

The tour 300 may additionally be associated with a region (e.g., a geographic area of a predefined size), where the region can be an attribute of the block. Local handling locations or delivery locations of the tour 300 can be outside of the region, but the pre-planned transportation resource 320 and the start and end location 316 can be associated with the region.

Figure 4:
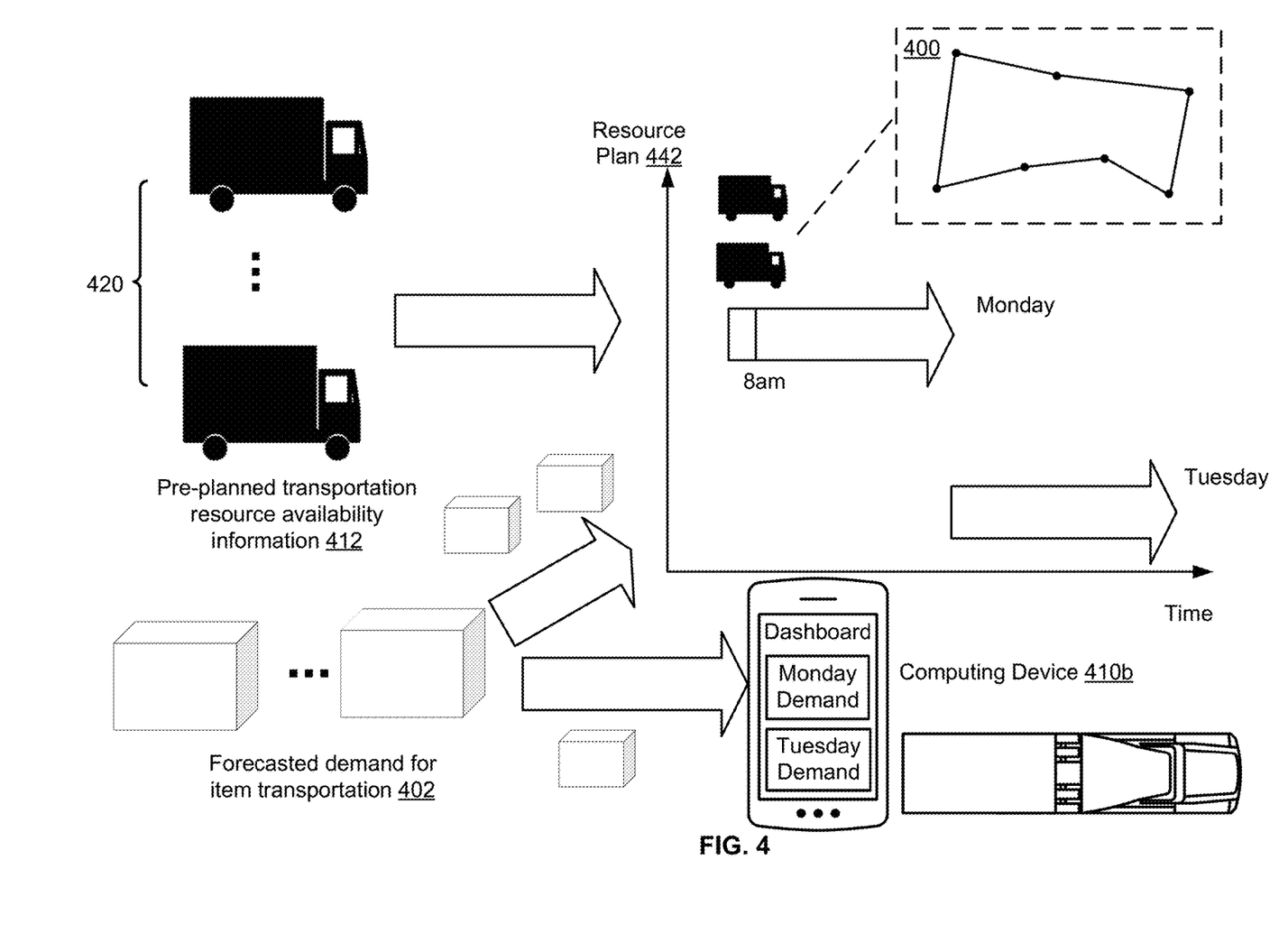
FIG. 4 illustrates an example of a resource plan for routing vehicles and transporting items, according to an embodiment of the present disclosure.

FIG. 4 illustrates a resource plan 442 for routing vehicles and transporting items, according to an embodiment of the present disclosure. The resource plan 442 may be determined by a computing system, such as the computing system 130 in FIG. 1. The computing system can use an optimization model to determine the resource plan 442. The optimization model jointly uses block information (as in FIG. 2) and tour information (as in FIG. 3) to generate the resource plan 422.

In an example, the computing system knows the block information, including a scheduling of the blocks and a capacity of the blocks. The capacity of the blocks can include a number of blocks of each delivery driver type and in a region. The block information can be determined based on availability information 412 for pre-planned transportation resources 420, costs associated with the pre-planned transportation resources 420, a forecasted demand 402, and costs associated with on-demand delivery services. As illustrated, the block information includes a block beginning at 8:00 am on Monday that is eight hours long.

The computing system then determines the resource plan 442 for the block information. The resource plan 442 can indicate a planned route 400 per block of the blocks. The route 400 of a block can be a potential tour based on a portion of the forecasted demand 402 that is to be handled by the block. Depending on its value, the route 400 can be serviced by one or more pre-planned transportation resources or can be left to one or more of the on-demand transportation resources. The route 400 can be subsequently updated based on the actual demand. To do this, the computing system determines a portion of the forecasted demand 402 to be serviced by the pre-planned transportation resources 420 and a portion of the forecasted demand 402 to be serviced by on-demand transportation resources. Alternatively, a portion of the blocks can be determined to be serviced by the on-demand transportation resources. The amount of the forecasted demand 402 or the number of blocks allocated to each type of resource can be determined to optimize the transportation cost of the forecasted demand 402.

As illustrated, two portions of the forecasted demand 402 are assigned to the pre-planned transportation resources 420, and one portion of the forecasted demand 402 is available to on-demand transportation resources. The portion available for on-demand transportation resources can be displayed in a dashboard of a computing device 410b accessible by the on-demand transportation resources. A delivery driver can then view the dashboard and select a portion of the available demand to deliver within its associated time period.

Figure 5:
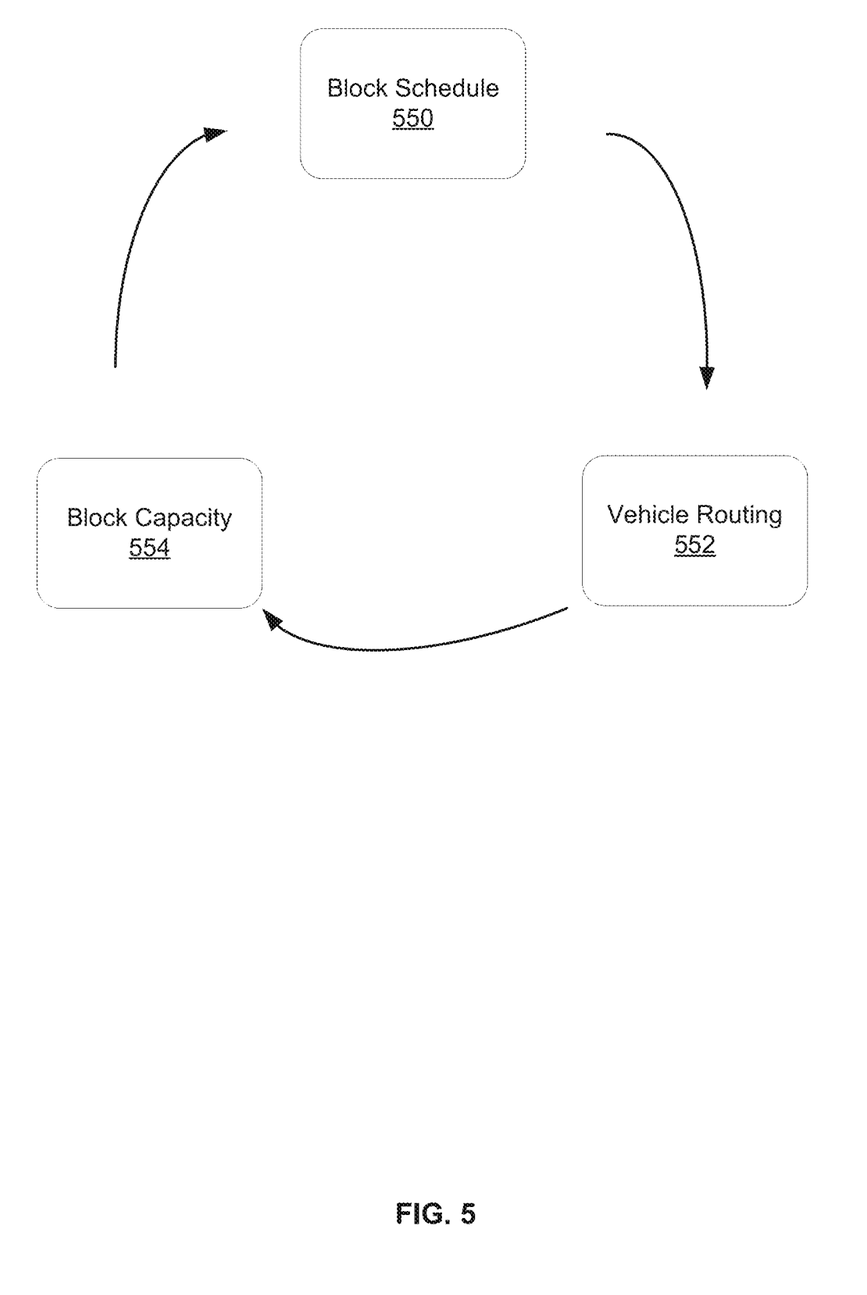
FIG. 5 illustrates an example of an iterative process for determining a resource plan for transporting a forecasted demand, according to an embodiment of the present disclosure.

FIG. 5 illustrates an example of an iterative process for determining a resource plan for transporting a forecasted demand, according to an embodiment of the present disclosure. The iterative process may be performed by an optimization model, such as the optimization model described in FIG. 4, where the optimization model can be executed by a computing system, such as the computing system 130 in FIG. 1.

Generally, the optimization model considers a block capacity (e.g., how many blocks are needed during a planning horizon), a block schedule (e.g., the timing on daily or some other periodic basis of the blocks during the planning horizon), and vehicle routing (e.g., a planned route per transportation vehicle for transportation a portion of the forecasted demand within a block). The block capacity, the block schedule, and the vehicle routing can be variables to the optimization model. The input to this model can include availability information of the pre-planned transportations, information about the forecasted demand, and other transportation related information (e.g., cost of the pre-planned resources, use costs of on-demand transportation resources). The optimization model iteratively searches for the solution that optimizes a parameter (e.g., the cost, a throughput, a transportation time, etc.) by changing the values of the variables and determining the effect to the optimization parameter. The optimal solution corresponds to the resource plan. Commonly, the search is computationally complex and may not be possible to resolve in a timely manner given the possible values these variables may take and the combination of these values. To overcome this computational complexity or even impossibility (e.g., in terms of finding the optimal solution in a timely manner), the iterative search can join two of the three variables at each search step to reduce the possible number of combinations. In a particular illustration, the optimization model uses an RMP approach to achieve this goal.

The optimal block capacity, the optimal block schedule, and the optimal routing are interdependent and thus affect total transportation cost. Therefore, the objective is to generate the resource plan that minimizes total transportation cost, which includes block cost and on-demand transportation cost. The computing system can use an optimization model to solve for the resource plan that minimizes the transportation cost. An RMP approach used by the optimization model can generate candidate blocks based on availability information and costs of pre-planned transportation resources and candidate tours based on the forecasted demand. The RMP approach can iteratively search for block-tour combinations that optimize the item transportation. The iterative searching involves combining two of a block schedule 550, a vehicle routing 552, and a block capacity 554 into one variable and the third remains its own variable. The block schedule 550 includes a start time of every block, the vehicle routing 552 is a candidate tour for each block, and the block capacity 554 is a total number of candidate blocks for each delivery driver type and region. The transportation cost is then optimized for the two variables to determine the resource plan.

The optimization model can explore a change to the block schedule 550, and increase or a decrease to the block capacity 554, and a change to the planning of the vehicle routing 552. For example, the block schedule 550 may change, so the optimization model can explore a change to the vehicle routing 552 based on the change to the block schedule 550. To illustrate, a block may be added for the planning horizon, so the optimization model can determine whether tours are to be changed for each block based on the addition of the block. Additionally or alternatively, the optimization model can explore an increase or decrease to the block capacity 554 based on a change to the vehicle routing 552. When a change to the block schedule 550, the vehicle routing 552, or the block capacity 554 occurs, the optimization model can combine two of these aspects as one variable to iteratively search for the block-tour combinations.

In an example, a candidate tour can be associated with a candidate block based on a start time of the candidate tour being the same or later than the start time of the scheduled candidate block. The optimization model can maintain the candidate tour as an option for the candidate block during the determination of the resource plan. Alternatively, a candidate block may be removed from the planning of the vehicle routing 552 based on a start time for the candidate block being earlier than the start time of the scheduled candidate block. For example, the block schedule 550 can indicate a start time of 9:00 am for a block, and during the vehicle routing 552, a start time of the candidate tour can be determined to be 8:00 am. As a result, the optimization model can remove the candidate tour from consideration for the block.

Figure 6:
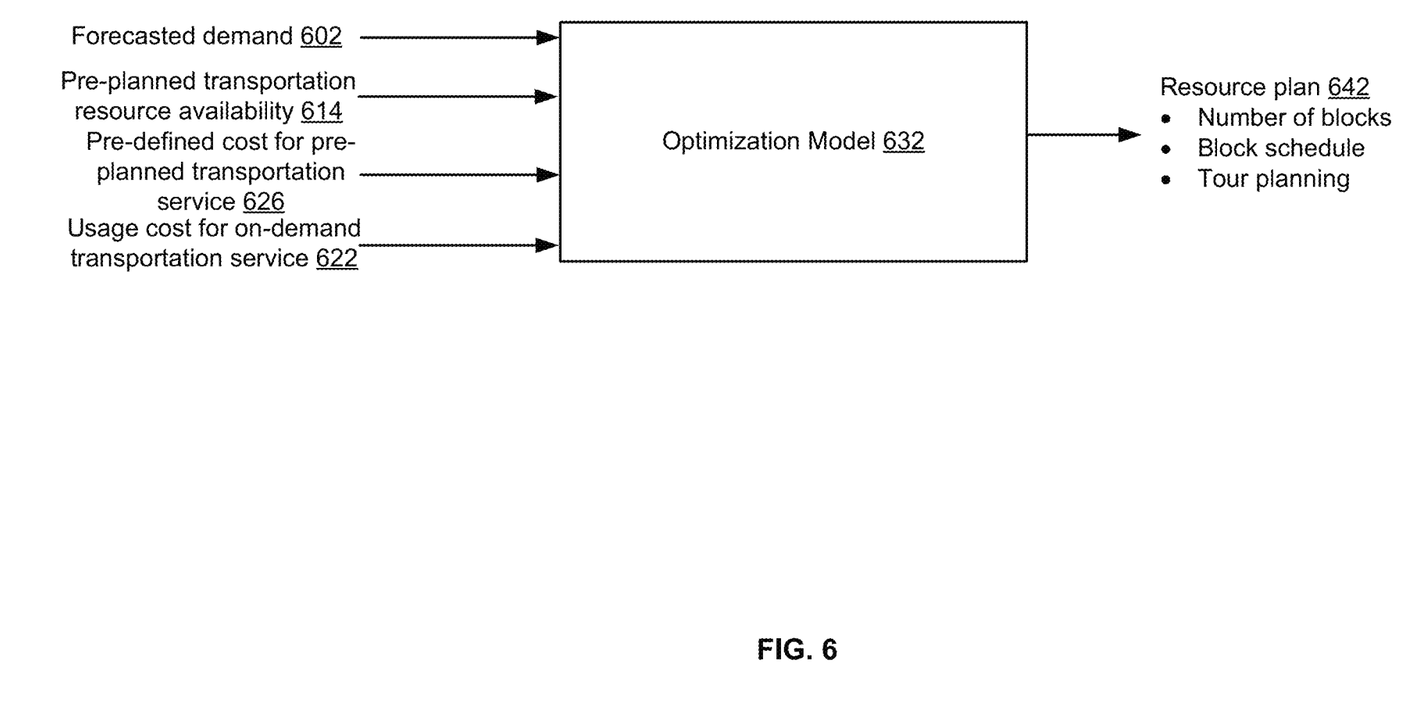
FIG. 6 illustrates an example of an optimization model for generating a resource plan, according to an embodiment of the present disclosure.

FIG. 6 illustrates an example of an optimization model 632 for generating a resource plan 642, according to an embodiment of the present disclosure. The optimization model 632 may be part of a resource planning tool, such as the resource planning tool 132 in FIG. 1 that is implemented on the computing system 130.

In an example, the optimization model 632 can minimize a transportation cost of a forecasted demand 602 of items. The optimization model 632 can use column generation and a shortest path algorithm to determine the resource plan 642.

The optimization model 632 can receive the forecasted demand 602, pre-planned transportation resource availability 614, a pre-defined cost for a pre-planned transportation service 626, and a usage cost for an on-demand transportation service 622 as inputs. The optimization model 632 can then optimize the transportation cost based on the inputs by exploring variables of candidate blocks and candidate tours per candidate block. The optimization model 632 outputs the resource plan 642 which is the optimized solution of a number of blocks, a block schedule, and potential tour planning for the blocks. The blocks and the potential tours are from the candidate blocks and the candidate tours.

One approach involves the optimization model 632 using a relaxed RMP approach that includes sets I, S, $R_s$, and $R_i$. Set I corresponds to a set of loads, set S corresponds to a set of delivery driver types, set $R_s$ corresponds to a set of tours generated for a block of delivery driver type $s \in S$, and set $R_i$ corresponds to a set of routes that cover load $i \in I$. The delivery driver types are based on a length of time for their blocks and the region associated with the pre-planned transportation resource. Every tour is associated to exactly one block type it was generated for. Identical candidate tours (e.g., tours covering the same set of loads) generated for blocks of different delivery driver types (s' and s'') are considered as different, so that $R_{s'} \cap R_{s''} = 0$ always holds.

The relaxed RMP approach can also use parameters $C_i$, $C_r$, $UB_s$, and $LB_s$. $C_i$ corresponds to an all-in on-demand transportation service cost of load $i \in I$, $C_r$ corresponds to an all-in cost of tour $r \in R$, $UB_s$ corresponds to an upper bound for a number of blocks of delivery driver type $s \in S$, and $LB_s$ corresponds to a lower bound for a number of blocks of delivery driver type $s \in S$.

The relaxed RMP approach can also include decision variables of $x_r$ and $y_i$, where $x_r$ is one if route $r \in R$ is selected and zero otherwise, and $y_i$ is one of load $i \in I$ is tendered using the on-demand transportation service and zero otherwise. The objective function to minimize the transportation cost can then be expressed as:

$$\min \Sigma_{r \in \cup_{s \in S} R_s} C_r x_r + \Sigma_{i \in I} C_i y_i \quad (1)$$

with constraints:

$$\Sigma_{r\in R_i}x_r+y_i\geq 1\,\forall i\in I \tag{2}$$

$$\Sigma_{r\in R_s}x_r\leq UB_s\,\forall s\in S \tag{3}$$

$$\Sigma_{r\in R_s}x_r\geq LB_s\,\forall s\in S \tag{4}$$

$$x_r\geq 0\,\forall r\in\cup_{s\in S}R_s \tag{5}$$

$$y_i\geq 0\,\forall i\in I \tag{6}$$

Constraint (2) ensures that every load is fulfilled and constraints (3) and (4) allow the formulation of upper or lower bounds for the number of blocks by delivery driver type. For a block of a particular delivery driver type, a tour can be found that maximizes the term $\Sigma_{i\in I_r}\pi_i+\lambda_s+\gamma_s$. If a new tour (r) has a negative reduced cost (e.g., if $\sigma:=C_r-(\Sigma_{i\in I_r}\pi_i+\lambda_s+\gamma_s)<0$), it is added as a column to the RMP approach. The RMP approach can terminate when it is impossible to create an additional tour with any of the candidate block types.

The optimal solution $x^*_r$ of the relaxed RMP approach (e.g., Eqns. (1) to (6)), provides the optimal number of blocks for every delivery driver type: $Q_s:=\Sigma_{r\in R_s}x^*_r$.

A modified RMP approach can involve an objective function expressed as:

$$\min\Sigma_{r\in\cup_{s\in S}R_s}0x_r+\Sigma_{i\in I}C_iy_i \tag{7}$$

with constraints:

$$\Sigma_{r\in R_i}x_r+y_i\geq 1\,\forall i\in I \tag{8}$$

$$\Sigma_{r\in R_s}x_r\leq Q_s\,\forall s\in S \tag{9}$$

$$x_r\in\{0,1\}\,\forall r\in\cup_{s\in S}R_s \tag{10}$$

$$y_i\in\{0,1\}\,\forall i\in I \tag{11}$$

The modified RMP approach can formulate the capacity constraint for every delivery driver type (see constraint (9)). As a result, discrete tours and blocks can be selected so that the value of covered loads is maximized and the optimal number of blocks per driver delivery type is not breached.

Figure 7:
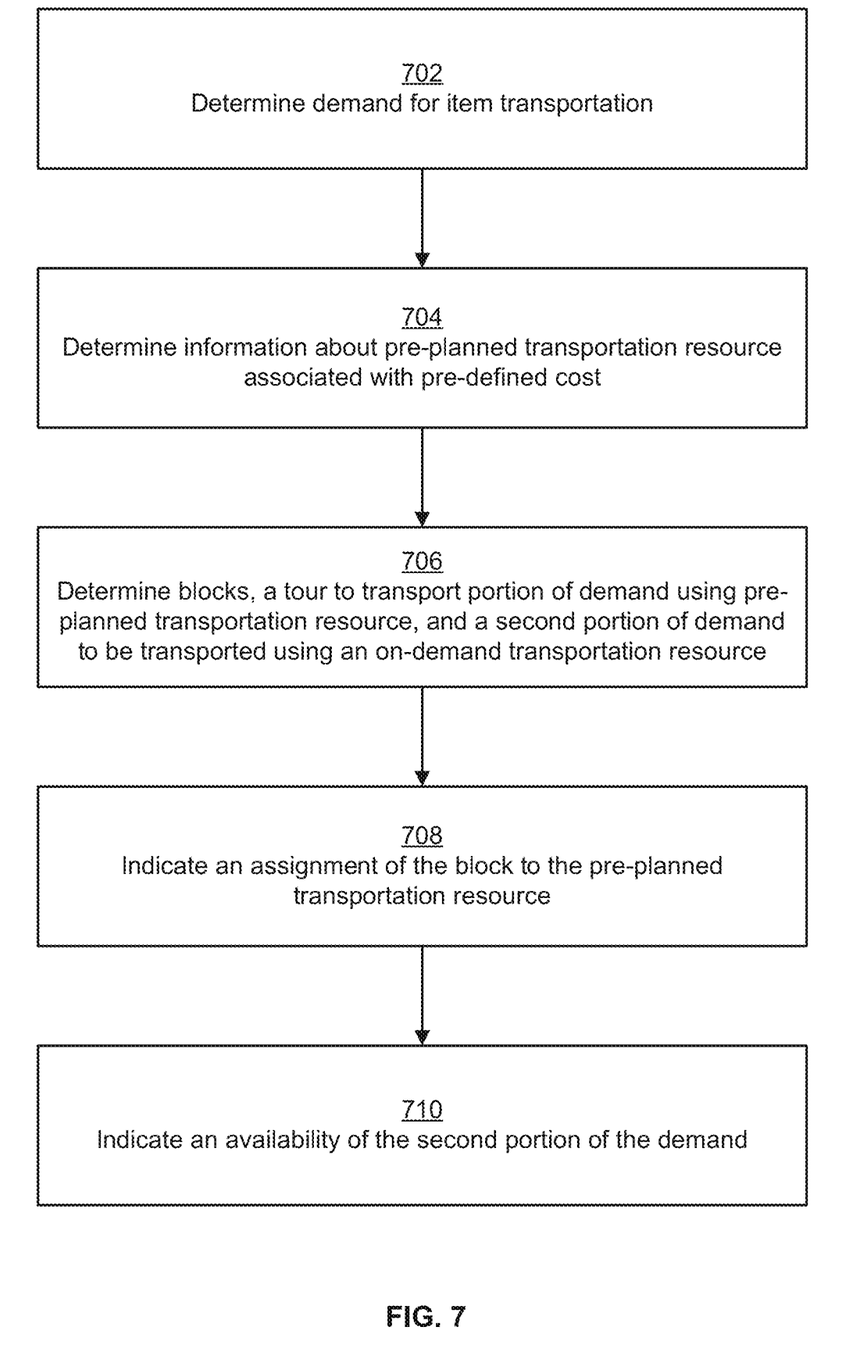
FIG. 7 illustrates an example of a flow for determining blocks and tours for a forecasted demand, according to an embodiment of the present disclosure.

FIG. 7 illustrates an example of a flow for determining blocks and tours for a forecasted demand, according to an embodiment of the present disclosure. Operations of the flow can be performed by a computing system, such as the computing system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 702, where the computing system determines a demand for item transportation. The demand is an expected demand for transportation during a planning horizon (e.g., an upcoming week). The computing system can determine the demand based on a demand during previous planning horizons.

In an example, the flow includes operation 704, where the computing system determines information about a pre-planned transportation resource (e.g., delivery drivers) available during the planning horizon. The pre-planned transportation resource is associated with a pre-planned delivery service, and the pre-planned delivery service is associated with a pre-defined cost that is independent of actual usage of the pre-planned delivery service.

In an example, the flow includes operation 706, where the computing system determines blocks, a tour to transport a portion of the demand using the pre-planned transportation resource, and a second portion of the demand to be transported using on-demand delivery services (e.g., a loadboard). The computing system can use an optimization model (e.g., optimization model 632 in FIG. 6) to make the determinations. Each block can have a time length and can be assignable to one of the pre-planned transportation resources. The tour can correspond to a route with a same start and end location for delivering loads of the demand. Each of the on-demand delivery services is associated with a corresponding use cost that depends on actual usage of the on-demand delivery service.

The optimization model can optimize an overall item transportation cost by using the demand, the information, the pre-defined costs of the pre-planned delivery services, and the use costs of the on-demand delivery services as inputs. The optimization model can explore variables that include candidate blocks and candidate tours per block to determine a resource plan of the blocks, tour, and portion of the demand to be transported by the on-demand delivery services. The optimization model may iteratively group two of the block schedule, vehicle routing, and block capacity variables together to determine the resource plan. The block and the tour determined by the optimization model are one of the candidate blocks and one of the candidate tours, respectively.

In an example, the flow includes operation 708, where the computing system indicates an assignment of a block of the blocks to the pre-planned transportation resource. The assignment can be displayed on a computing device associated with the pre-planned transportation resource. The computing device can display a start time of the block, an indication of the tour to cover during the block, and an indication of a region of the tour. The indication of the tour can change as the actual demand is determined for the planning horizon.

The tour assignment can be an initial tour assignment. The computing system can then track the actual demand and update the tours assigned to a scheduled block some time interval ahead of the scheduled block (e.g., the day before) based on the actual demand. In this way, the tours are further optimized given the actual demand.

In an example, the flow includes operation 710, where the computing system indicates an availability of the second portion of the demand. The availability can be indicated at a computing device associated with the on-demand transportation resource by presenting information about loads that are included in the second portion and a timing of the loads. Information about available blocks can additionally or alternatively be presented at the computing device.

Figure 8:
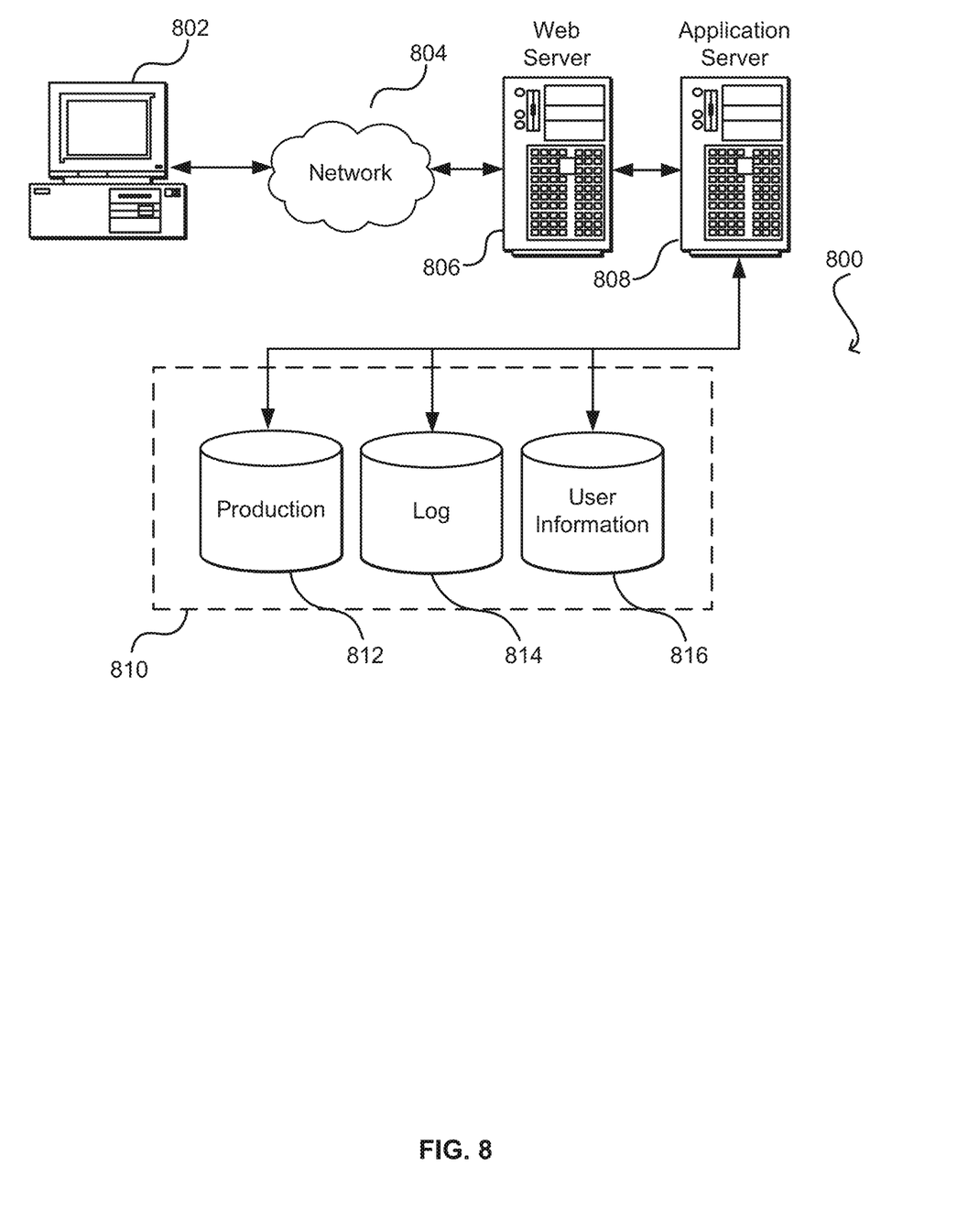
FIG. 8 illustrates an environment in which various embodiments can be implemented

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system comprising:
one or more processors; and
one or more memories storing computer-readable instructions that, upon execution by the one or more memories, configure the computer system to:
determine, by at least querying a data store during a time window prior to a start of a planning horizon, a demand for item transportation expected during the planning horizon;
determine, by at least querying the data store during the time window, first information about first delivery drivers available during the planning horizon and second information associated with second delivery drivers, wherein each one of the first delivery drivers is associated with a pre-planned delivery service for the planning horizon, wherein each pre-planned delivery service is associated with a pre-defined cost that is independent of actual usage of the pre-planned delivery service, wherein each one of the second delivery drivers is associated with an on-demand delivery service, and wherein the second information indicates a use cost that depends on actual use of on-demand delivery services;
determine, by at least executing program code of an optimization model, (i) blocks each having a corresponding time length and assignable to one of the delivery drivers, (ii) tours each assignable to one of the blocks and usable to transport a different portion of the demand, (iii) a first assignment of a first block to a first delivery driver of the first delivery drivers and a first assignment of a first tour to the first block, (iv) a remaining portion of the demand to be transported using the on-demand delivery services, and (v) a second assignment of an item from the remaining portion to a second tour and a second assignment of the second tour to a second block, wherein:
the optimization model is configured to perform an iterative search that optimizes, by at least solving a restricted master problem (RMP) that jointly considers resource information and tour information by combining at least two variables into a single variable such that the iterative search is computationally reduced and completed by the computer system before an end of the time window, an overall item transportation cost, the RMP solved by at least using the demand, the first information, the second information, and pre-defined costs of the pre-planned delivery services as inputs to the program code and exploring variables that include candidate blocks and candidate tours per candidate block, and
the block and the tour are one of the candidate blocks and one the candidate tours respectively;
store, in the data store, a first output and a second output, the first output indicating the first assignment of the first block and the first assignment of the first tour, the second outputting indicating the remaining portion of the demand, the second assignment of the item, and the second assignment of the second tour;
cause by at least sending the first output to a first computing device of the first delivery driver over a data network, the first computing device to present, at a first user interface, the first assignment of the first block as a schedule and to present the first assignment of the first tour, the first output sent based at least in part on the first delivery driver being associated with the corresponding pre-planned delivery service;
determine, by at least querying the data store at a predefined time prior to the end of the time window, an update to the demand;
determine, by at least re-executing the program code of the optimization model based at least in part on the update and in which the iterative search is skipped, a change to the first tour;
cause the first computing device to present the schedule and the change to the first tour;
receive, over the data network from a second computing device of a second delivery driver of the second delivery drivers, a request for delivery information; and
cause, by at least sending the second output to the second computing device over the data network in response to the request, the second computing device to present, at a second user interface, an availability of the of the second block and the second assignment of the second tour, the second output sent based at least in part on the second delivery driver being associated with the corresponding on-demand delivery service.

2. The computer system of claim 1, wherein the optimization model is configured to generate the candidate blocks based at least in part on the first information and the candidate tours based at least in part on the demand and the iterative search for block-tour combinations that optimize the overall item transportation cost.

3. The computer system of claim 1, wherein the demand, the first information, and the second information are determined within the time window to the earliest of a first start time of the first block and a second start time of the second block, wherein the executing of the program code occurs during the time window, and wherein the program code is configured such that the first output is generated prior to the earliest of the first start time and the second start time.

4. The computer system of claim 1, wherein the variables comprise a schedule of candidate blocks, a total number of candidate blocks, and a planning of candidate tours, and wherein the RMP is configured to combine, in the iterative search, two of the variables.

5. A method implemented on a computer system, the method comprising:
determining, during a time window prior to a start of a planning horizon, a demand for item transportation expected during the planning horizon;
determining, during the time window, first information about a pre-planned transportation resource available during the planning horizon, the pre-planned transportation resource associated with a pre-defined cost that is independent of usage of the pre-planned transportation resource during the planning horizon;
determining, during the time window, second information about an on-demand transportation resource, the on-demand transportation resource associated with a use cost that depends on actual use of the on-demand transportation resource;

determining, by at least executing an optimization model, (i) a first block having a time length, (ii) a first tour to transport during the first block, a first portion of the demand using the pre-planned transportation resource, (iii) a first assignment of the first block and the first tour to the pre-planned transportation resource, (iv) a second portion of the demand that is unassigned to any pre-planned transportation resource, and (v) a second assignment of an item from the second portion to a second tour and the second tour to a second block, wherein:

the optimization model is configured to perform an iterative search that combines at least two variables associated with resource information and tour information into a single variable such that the iterative search is computationally reduced and completed by the computer system before an end of the time window, an overall item transportation cost, the iterative search at least using the demand, the first information, the pre-defined cost, and the use cost as inputs and exploring variables that include candidate blocks and candidate tours per candidate block, and the first block and the first tour are one of the candidate blocks and one the candidate tours respectively;

causing, a first computing device of the pre-planned transportation resource, to present, on a first graphical user interface, the first assignment prior to the start of the planning horizon;

determining, at a predefined time prior to the end of the time window, an update to the demand;

determining, by at least re-executing the optimization model based at least in part on the update and in which the iterative search is skipped, a change to the first tour; and causing the first computing device to present the change to the first tour prior to a start of the first block.

6. The method of claim 5, wherein determining the first information about the pre-planned transportation resource comprises determining an availability of a delivery driver during the planning horizon, wherein the delivery driver is associated with a pre-planned delivery service for the planning horizon, wherein the pre-planned delivery service is associated with the pre-defined cost that is independent of actual usage of the pre-planned delivery service.

7. The method of claim 6, wherein determining the first information about the pre-planned transportation resource further comprises determining a delivery driver type, wherein the first block is generated for the delivery driver type and for a region in which the pre-planned delivery service is to be performed.

8. The method of claim 7, wherein the first tour comprises a start location and an end location within the region.

9. The method of claim 5, further comprising:
generating, based at least in part on the first information, a schedule of candidate blocks; and
generating, based at least in part on the demand, a planning of candidate tours for a scheduled candidate block, wherein the schedule and the planning are variables of the optimization model.

10. The method of claim 9, further comprising:
generating a total number of candidate blocks, wherein the total number is a variable of the optimization model.

11. The method of claim 10, wherein the optimization model is configured to explore a change to the schedule of candidate blocks, an increase or a decrease to the total number of candidate blocks, and a change to the planning of candidate tours.

12. The method of claim 10, wherein the optimization model uses a restricted master problem (RMP) approach configured to explore the change to the planning of candidate tours based at least in part on the change to the schedule of candidate blocks.

13. The method of claim 12, wherein the RMP approach is configured to explore an increase or a decrease to the total number of candidate blocks based at least in part on the change to the planning of candidate tours.

14. The method of claim 10, wherein the optimization model uses a restricted master problem (RMP) approach configured to iteratively search for block-tour combinations, wherein the iterative search combines two of the change to the schedule, the change to the planning, and an increase or a decrease to the total number as the single variable.

15. One or more non-transitory computer-readable storage media storing instructions, that upon execution on a computer system, cause the computer system to perform operations comprising:
determining, during a time window prior to a start of a planning horizon, a demand for item transportation expected during the planning horizon;
determining, during the time window, first information about a pre-planned transportation resource available during the planning horizon, the pre-planned transportation resource associated with a pre-defined cost that is independent of usage of the pre-planned transportation resource during the planning horizon;
determining, during the time window, second information about an on-demand transportation resource, the on-demand transportation resource associated with a use cost that depends on actual use of the on-demand transportation resource;
determining, by at least executing an optimization model, (i) a first block having a time length, (ii) a first tour to transport, during the first block a first portion of the demand using the pre-planned transportation resource, (iii) a first assignment of the first block and the first tour to the pre-planned transportation resource, (iv) a second portion of the demand that is unassigned to any pre-planned transportation resource, and (v) a second assignment of an item from the second portion to a second tour and the second tour to a second block, wherein:

the optimization model is configured to perform an iterative search that combines at least two variables associated with resource information and tour information into a single variable such that the iterative search is computationally reduced and completed by the computer system before an end of the time window, an overall item transportation cost, the iterative search at least using the demand, the first information, the pre-defined cost, and the use cost as inputs and exploring variables that include candidate blocks and candidate tours per candidate block, and the first block and the first tour are one of the candidate blocks and one the candidate tours respectively;

causing, a first computing device of the pre-planned transportation resource, to present, on a first graphical user interface, the first assignment prior to the start of the planning horizon;

determining, at a predefined time prior to the end of the time window, an update to the demand;

determining, by at least re-executing the optimization model based at least in part on the update and in which the iterative search is skipped, a change to the first tour; and causing the first computing device to present the change to the first tour prior to a start of the first block.

16. The one or more non-transitory computer-readable storage media of claim 15, wherein the operations further comprise:

generating a schedule of candidate blocks, a planning of candidate tours for a scheduled candidate block, and a total number of candidate blocks, wherein the schedule, the planning, and the total number are variables of the optimization model.

17. The one or more non-transitory computer-readable storage media of claim 16, wherein the scheduled candidate block is associated with a start time, and wherein a first candidate tour is associated with the scheduled candidate block for the planning based at least in part on a start time of the first candidate tour being the same or later than the start time of the scheduled candidate block.

18. The one or more non-transitory computer-readable storage media of claim 17, wherein a second candidate tour is removed from the planning based at least in part on a start time of the second candidate tour being the earlier than the start time of the scheduled candidate block.

19. The one or more non-transitory computer-readable storage media of claim 15, wherein indicating, to the first computing device, the first assignment of the first block and the first tour comprises providing, to the first computing device for presentation on the first computing device to a delivery driver, a start time of the first block, an indication of the first tour to cover during the first block, and an indication of a region of the first tour.

20. The one or more non-transitory computer-readable storage media of claim 15, wherein the operations further comprise:

indicating, to a second computing device, an availability of the second portion of the demand or an availability of blocks by providing, to the second computing device for presentation on the second computing device, information about loads that are included in the second portion and timing of the loads or information about available blocks.

* * * * *